United States Patent
Diaconu et al.

(10) Patent No.: US 10,592,494 B2
(45) Date of Patent: Mar. 17, 2020

(54) COLLECTION RECORD FOR OVERLAPPING DATA STREAM COLLECTIONS

(71) Applicant: Microsoft Technology Licensing, LLC, Redmond, WA (US)

(72) Inventors: Cristian Diaconu, Kirkland, WA (US); Christian Damianidis, Seattle, WA (US); Arkadi Brjazovski, Redmond, WA (US); Rogerio Ramos, Redmond, WA (US); Raghavendra Thallam Kodandaramaih, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 336 days.

(21) Appl. No.: 14/686,560

(22) Filed: Apr. 14, 2015

(65) Prior Publication Data

US 2016/0306841 A1    Oct. 20, 2016

(51) Int. Cl.
*G06F 16/23*    (2019.01)

(52) U.S. Cl.
CPC .................. *G06F 16/2365* (2019.01)

(58) Field of Classification Search
None
See application file for complete search history.

(56) References Cited

U.S. PATENT DOCUMENTS

| | | | |
|---|---|---|---|
| 5,721,815 A | 2/1998 | Ottesen et al. | |
| 5,806,075 A | 9/1998 | Jain et al. | |
| 5,845,292 A | 12/1998 | Bohannon et al. | |
| 6,052,695 A | 4/2000 | Abe | |
| 6,154,847 A * | 11/2000 | Schofield | G06F 11/1471 |
| | | | 714/20 |
| 6,349,310 B1 | 2/2002 | Klein et al. | |
| 6,353,828 B1 | 3/2002 | Ganesh et al. | |
| 6,397,227 B1 | 5/2002 | Klein et al. | |
| 6,446,086 B1 | 9/2002 | Bartlett et al. | |
| 6,477,546 B1 | 11/2002 | Torbert et al. | |
| 6,484,181 B2 | 11/2002 | Attaluri et al. | |
| 6,557,048 B1 | 4/2003 | Keller et al. | |
| 6,625,601 B1 | 9/2003 | Molloy | |

(Continued)

FOREIGN PATENT DOCUMENTS

CN    101625655 B    5/2011

OTHER PUBLICATIONS

Office Action dated Mar. 9, 2016 cited in U.S. Appl. No. 14/686,525.
(Continued)

*Primary Examiner* — Kris E Mackes
*Assistant Examiner* — Soheila (Gina) Davanlou
(74) *Attorney, Agent, or Firm* — Workman Nydegger

(57) ABSTRACT

The insertion into a data stream of collection records associated with multiple collections of data items in the data stream, for purposes of aiding in subsequent processing of the data stream by collections. Each collection record comprises a collection definition that does not overlap with the collection definition in any of the sequence of collection records including the collection definition of any neighboring collection record in the sequence of collection records. Each collection record also includes a data stream address range extending from the first data item to the last data item in the collection.

24 Claims, 8 Drawing Sheets

(56) References Cited

U.S. PATENT DOCUMENTS

| | | | |
|---|---|---|---|
| 6,728,719 B1 | 4/2004 | Ganesh et al. | |
| 6,801,938 B1 | 10/2004 | Bookman et al. | |
| 7,007,269 B2 | 2/2006 | Sluiman et al. | |
| 7,293,145 B1* | 11/2007 | Baird | G06F 11/1471 711/162 |
| 7,451,168 B1 | 11/2008 | Patterson | |
| 7,487,160 B2 | 2/2009 | Whyte | |
| 7,512,740 B2 | 3/2009 | Diefendorff | |
| 7,519,628 B1 | 4/2009 | Leverett et al. | |
| 7,761,766 B2 | 7/2010 | Boldt et al. | |
| 7,844,760 B2 | 11/2010 | Jeyaseelan et al. | |
| 8,032,885 B2 | 10/2011 | Fish | |
| 8,352,425 B2 | 1/2013 | Bourbonnais et al. | |
| 8,489,655 B2 | 7/2013 | Aronovich et al. | |
| 8,589,890 B2 | 11/2013 | Eccles et al. | |
| 8,650,169 B1 | 2/2014 | Jacobs et al. | |
| 8,671,085 B2 | 3/2014 | Dhamankar et al. | |
| 8,719,462 B1 | 5/2014 | He et al. | |
| 8,738,568 B2 | 5/2014 | Ghosh et al. | |
| 8,745,012 B2 | 6/2014 | Rusher et al. | |
| 8,850,452 B2 | 9/2014 | Vishnu | |
| 8,868,234 B2 | 10/2014 | Sanders et al. | |
| 8,868,527 B1 | 10/2014 | Fallis et al. | |
| 8,880,480 B2 | 11/2014 | Kundu et al. | |
| 9,138,652 B1 | 9/2015 | Thompson et al. | |
| 9,256,477 B2 | 2/2016 | Truong et al. | |
| 9,262,519 B1 | 2/2016 | Saurabh et al. | |
| 9,418,094 B2 | 8/2016 | Wong et al. | |
| 9,460,008 B1 | 10/2016 | Leshinksy et al. | |
| 9,563,397 B1 | 2/2017 | Stoev et al. | |
| 9,619,544 B2* | 4/2017 | Vermeulen | G06F 17/30575 |
| 9,626,394 B2 | 4/2017 | Schmidt et al. | |
| 9,760,617 B2 | 9/2017 | Shang et al. | |
| 2002/0103683 A1 | 8/2002 | Tsuda | |
| 2002/0120929 A1 | 8/2002 | Schwalb et al. | |
| 2002/0188831 A1 | 12/2002 | Jackson et al. | |
| 2003/0061537 A1 | 3/2003 | Cha et al. | |
| 2005/0223366 A1 | 10/2005 | Smith et al. | |
| 2006/0212492 A1 | 9/2006 | Jacobs et al. | |
| 2007/0220356 A1 | 9/2007 | Ruscio et al. | |
| 2007/0255979 A1 | 11/2007 | Deily et al. | |
| 2008/0058961 A1 | 3/2008 | Biberdorf et al. | |
| 2008/0066055 A1 | 3/2008 | Shebs | |
| 2008/0140733 A1 | 6/2008 | Chan et al. | |
| 2008/0270403 A1* | 10/2008 | Bookman | G06F 8/51 |
| 2008/0270838 A1 | 10/2008 | Dorai et al. | |
| 2009/0150599 A1 | 6/2009 | Bennett | |
| 2009/0287874 A1 | 11/2009 | Rogers et al. | |
| 2009/0287890 A1 | 11/2009 | Bolosky | |
| 2010/0185895 A1 | 7/2010 | Clark et al. | |
| 2010/0215143 A1 | 8/2010 | Basu et al. | |
| 2011/0029490 A1 | 2/2011 | Agarwal et al. | |
| 2011/0082835 A1 | 4/2011 | Agarwal et al. | |
| 2011/0161723 A1* | 6/2011 | Taleck | G06F 17/30156 714/4.11 |
| 2011/0202546 A1 | 8/2011 | Amit et al. | |
| 2011/0264898 A1 | 10/2011 | Chaudrhy et al. | |
| 2012/0059798 A1* | 3/2012 | Madhavarapu | G06F 16/178 707/655 |
| 2012/0109895 A1 | 5/2012 | Zwilling et al. | |
| 2012/0209817 A1* | 8/2012 | Golab | G06F 17/30516 707/688 |
| 2012/0278288 A1* | 11/2012 | Deshmukh | G06F 17/30575 707/672 |
| 2012/0290752 A1 | 11/2012 | Lim | |
| 2013/0117233 A1 | 5/2013 | Schreter | |
| 2013/0117234 A1 | 5/2013 | Schreter | |
| 2013/0232400 A1 | 9/2013 | Finnell et al. | |
| 2013/0290268 A1 | 10/2013 | Schreter | |
| 2013/0290649 A1* | 10/2013 | Jorgensen | H03K 21/38 711/154 |
| 2013/0332435 A1 | 12/2013 | Bernstein et al. | |
| 2014/0007119 A1 | 1/2014 | Liu et al. | |
| 2014/0032595 A1 | 1/2014 | Makkar et al. | |
| 2014/0172803 A1 | 6/2014 | Diaconu et al. | |
| 2014/0244701 A1 | 8/2014 | Welton et al. | |
| 2014/0279930 A1 | 9/2014 | Gupta et al. | |
| 2015/0100708 A1 | 4/2015 | Kegel | |
| 2015/0127679 A1 | 5/2015 | Wing | |
| 2015/0363396 A1 | 12/2015 | Sengupta et al. | |
| 2016/0147859 A1 | 5/2016 | Lee et al. | |
| 2016/0306654 A1 | 10/2016 | Diaconu et al. | |
| 2016/0306659 A1 | 10/2016 | Diaconu et al. | |
| 2016/0306713 A1 | 10/2016 | Diaconu et al. | |
| 2016/0306838 A1 | 10/2016 | Diaconu et al. | |
| 2016/0306839 A1 | 10/2016 | Diaconu et al. | |
| 2016/0306856 A1 | 10/2016 | Diaconu et al. | |

OTHER PUBLICATIONS

Final Office Action dated Aug. 9, 2016 cite in U.S. Appl. No. 14/686,525.

Office Action dated Sep. 19, 2016 issued in U.S. Appl. No. 14/686,515.

"International Preliminary Report on Patentability Issued in PCT Application No. PCT/US2016/026854", dated Oct. 21, 2016, 7 Pages.

Office Action issued in U.S. Appl. No. 14/686,480 dated Jan. 13, 2017.

Wigmore "What is a Log (Log File)" Nov. 2014, WhatIs.com, p. 1.

Notice of Allowance dated Mar. 9, 2017 cited in U.S. Appl. No. 14/686,525.

Office Action dated Mar. 27, 2017 cited in U.S. Appl. No. 14/686,515.

Notice of Allowance issued in U.S. Appl. No. 14/686,525 dated May 12, 2017.

Randal, "Disaster recovery 101: backing up the tail of the log", Jun. 18, 2010, https://www.sqlskills.compgs. 1-4.

Randal, "Advanced Backup and Restore Optiosn", May 18, 2011, http://sqlmag.com, pp. 1-7.

Poolet, "Backup and Restore Fundamentals", May 27, 2008, http://sqlmag.com, pp. 1-8.

Poolet, "What Is a TailLog Backup?", Feb. 24, 2008, http://sqlmag.com, p. 1.

Office Action dated Jun. 16, 2017 cited in U.S. Appl. No. 14/686,480.

Haraty, et al., "Damage Assessment and Recovery from Malicious Transactions Using Data Dependency for Defensive Information Warfare", In Proceedings of Science and Technology Vision, vol. 3, No. 4, Nov. 2007, pp. 43-50.

Patnaik, et al., "Transaction-Relationship Oriented Log Division for Data Recovery from Information Attacks", In Journal of Database Management, vol. 14, Issue 2, Apr. 2003, 3 pages.

Faleiro, et al., "Lazy Evaluation of Transactions in Database Systems", In Proceedings of ACM SIGMOD International Conference on Management of Data, Jun. 22, 2014, pp. 15-26.

Lomet, David, "Application Recovery: Advances toward an Elusive Goal", In Proceedings of International Workshop on High Performance Transaction Systems, Sep. 9, 4 pages.

"Oracle GoldenGate Performance Best Practices", In Oracle White Paper, Nov. 2014, 51 pages.

Diaconu, et al., "Hekaton: SQL Server's Memory-Optimized OLTP Engine", In Proceedings of ACM SIGMOD International Conference on Management of Data, Jun. 22, 2013, pp. 1243-1254.

"Set Segmenting Specification VI", Retrieved on: Decemeber 18, 2014, Available at: http://zone.ni.com/reference/en-XX/help/372846H-01/veristandmerge/set_segmenting_specification/.

International Search Report and Written Opinion for PCT Application No. PCT/US2016/026854, dated Jul. 18, 2016.

Office Action issued in U.S. Appl. No. 14/686,494 dated Sep. 13, 2017.

Office Action issued in U.S. Appl. No. 14/686,503 dated Sep. 19, 2017.

Office Action issued in U.S. Appl. No. 14/686,480 dated Oct. 4, 2017.

"Final Office Action Issued in U.S. Appl. No. 14/686,494", dated May 7, 2018, 25 Pages.

"Non Final Office Action Issued in U.S. Appl. No. 14/686,494", dated Oct. 23, 2018, 35 Pages.

(56) References Cited

OTHER PUBLICATIONS

"Non Final Office Action Issued in U.S. Appl. No. 15/959,211", dated Aug. 9, 2018, 18 Pages.
Office Action issued in U.S. Appl. No. 14/686,544 dated Jan. 24, 2018.
Office Action issued in U.S. Appl. No. 14/686,503 dated Jan. 31, 2018.
"Final Office Action Issued in U.S. Appl. No. 15/959,211", dated Jan. 15, 2019, 20 Pages.
"Final Office Action Issued in U.S. Appl. No. 14/686,494", dated May 16, 2019, 39 Pages.
"Notice of Allowance Issued in U.S. Appl. No. 15/959,211", dated May 30, 2019, 10 Pages.
Carr, Donal Wayne, "A Real-Time Active Database for High Transaction Loads and Moderate Deadlines", In Theses and Dissertation of Iowa State University, Jan. 1998, 223 Pages.
Office Action dated Jul. 3, 2017 cited in U.S. Appl. No. 14/686,544.
Ferri, Cesare: "Energy Efficient Synchronization Techniques for Embedded Architectures," 2008.
Notice of Allowance issued in U.S. Appl. No. 14/686,515 dated Dec. 27, 2017.

\* cited by examiner

COLLECTION RECORD FOR OVERLAPPING DATA STREAM COLLECTIONS

BACKGROUND

Computing systems and associated networks have revolutionized the way human beings work, play, and communicate. Nearly every aspect of our lives is affected in some way by computing systems. The proliferation of networks has allowed computing systems to share data and communicate, vastly increasing information access. For this reason, the present age is often referred to as the "information age".

Often, tasks performed on a data system are logged. For instance, each tasks performed has an associated entry in a log, with the entry having a log entry identifier (such as a log sequence number). Furthermore, in some cases, tasks are performed as part of a transaction such that either all of the tasks of the transaction are performed (if the transaction is "committed") or none of the tasks of the transaction are performed (if the transaction is "aborted"). Thus, after a transaction initiates, as tasks are performed for the transaction, it is not yet clear whether or not those tasks will be undone due to an abort of the transaction. Only upon a commit of the transaction is it clear that the task is performed.

In data systems that perform transactions in parallel, with tasks of different transactions being completed, the task entries associated with transactions are often interleaved within the log. For instance, the last task of a prior transaction is often completed after the first task of the next transaction is completed, resulting in overlap in tasks associated with neighboring temporal transactions. Often, a subsequent transaction initiated after a prior transaction will complete before the prior transaction is complete, resulting in some reordering of transaction completions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the insertion of collection records into a data stream for purposes of aiding in subsequent processing of the data stream. Each collection record comprises a collection definition that is not overlapping with the collection definition in any of the sequence of collection records including the collection definition of any neighboring collection record in the sequence of collection records. Specifically, any data item that satisfies the collection definition is included in the associated collection, and in none other. Each collection record also includes a data stream address range at least extending from the data stream address of the first data item in the collection to the data stream address of last data item of the collection.

The compactness condition with respect to the collection definition allows a wide variety of useful results when later using the log. This is especially true when the sequence of collection records are 1) included in the data stream after the last data item of the associated collection, and 2) are placed in the data stream in the same order as each collection is encountered in the data stream. For example, the data stream may be processed in parallel to, for instance, serialize the data stream. Another example is applicable in the case in which the data stream is a log and the data items represent tasks performed, and the collection is based on a transaction identifier, or transaction identifier range. In that case, during subsequent recovery, during redo, the collections may be processed in parallel, thereby speeding up recovery.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the insertion of collection records into a data stream for purposes of aiding in subsequent processing of the data stream. Each collection record comprises a collection definition that is not overlapping with the collection definition in any of the sequence of collection records including the collection definition of any neighboring collection record in the sequence of collection records. Specifically, any data item that satisfies the collection definition is included in the associated collection, and in none other. Each collection record also includes a data stream address range at least extending from the data stream address of the first data item in the collection to the data stream address of last data item of the collection.

The compactness condition with respect to the collection definition allows a wide variety of useful results when later using the log. This is especially true when the sequence of collection records are 1) included in the data stream after the last data item of the associated collection, and 2) are placed in the data stream in the same order as each collection is encountered in the data stream. For example, the data stream may be processed in parallel to, for instance, serialize the data stream. Another example is applicable in the case in which the data stream is a log and the data items represent tasks performed, and the collection is based on a transaction identifier, or transaction identifier range. In that case, during subsequent recovery, during redo, the collections may be processed in parallel, thereby speeding up recovery.

Some introductory discussion of a computing system will be described with respect to FIG. 1. Then, the creation of the sequence of collection records using the open collection data structure will be described with respect to FIGS. 2 through 8. The use of the sequence of collection records will then be described with respect to FIGS. 9 through 11.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
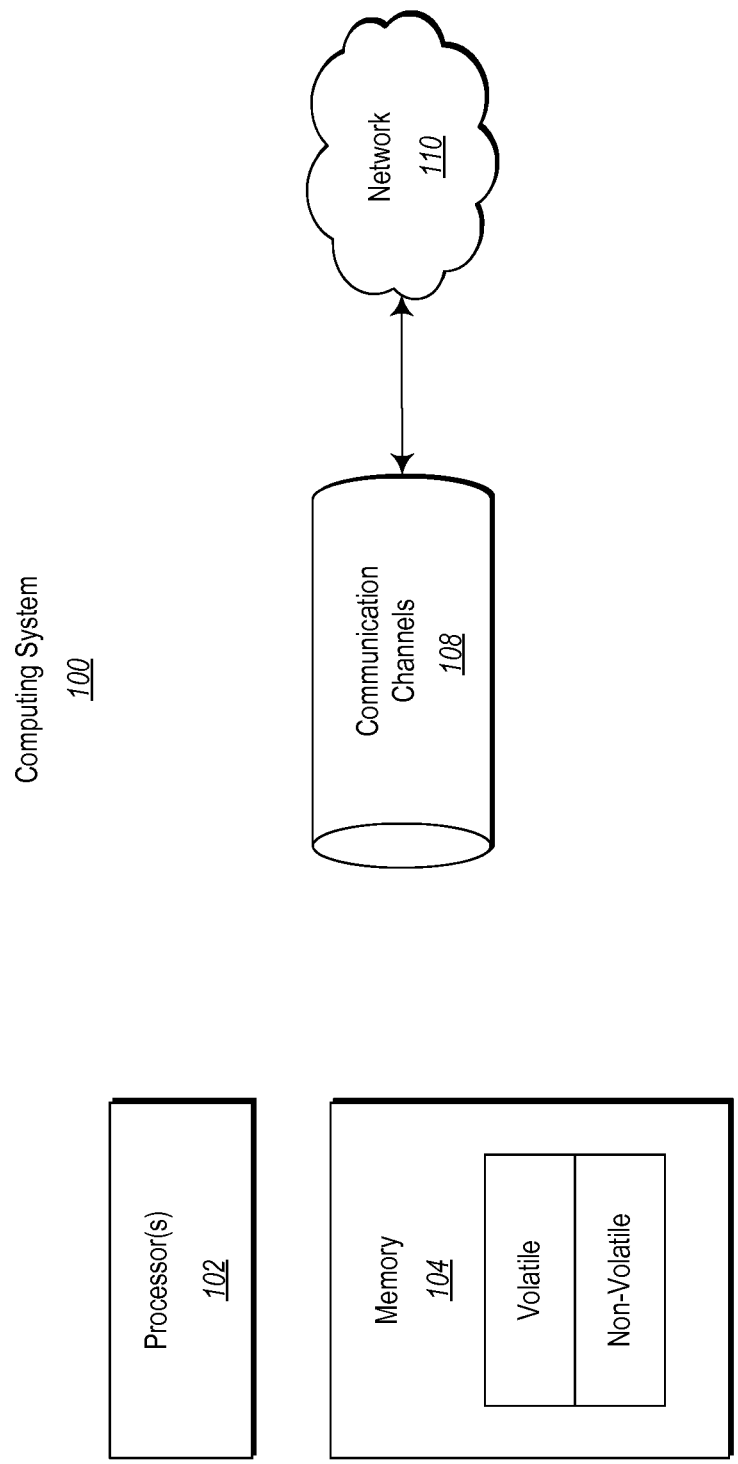
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 also includes a display, which may be used to display visual representations to a user.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
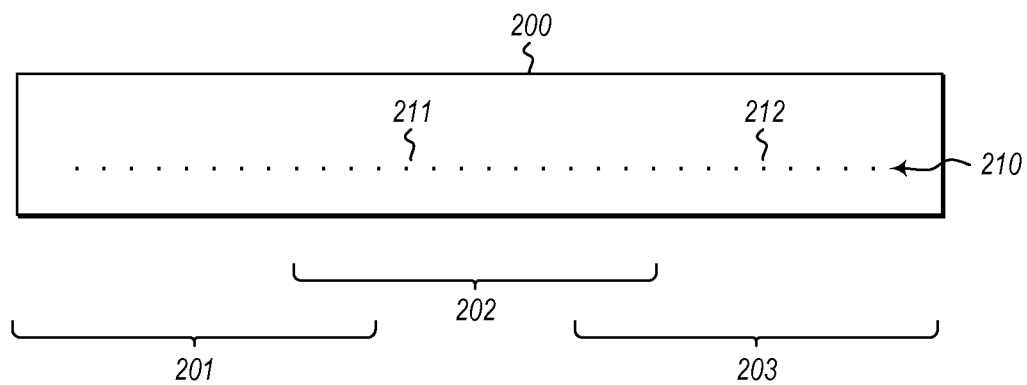
FIG. 2 abstractly illustrates a data stream that might be observed by a computing system such as the computing system of FIG. 1, in which there are several collections that overlap in the data stream.

FIG. 2 abstractly illustrates a data stream 200 that might be observed by a computing system such as the computing system 100 of FIG. 1. As symbolically represented by represented the continuous ellipses 210, the data stream 200 is filled with data items. Each data item may correspond to an associated collection of data that has one or more common attributes or properties. Each associated collection of data may overlap (as far as the data stream address is concerned) with one or more other collections of data within the data stream 200.

The attributes and parameters of the collections are selected (thereby defining the collection) so that parallel processing of the collections of data items is enhanced. For instance, the attributes and parameters may be selected such that dependencies between collections are eliminated or reduced and such that the collections can be processed in parallel. If there is a dependency between collections, such may be noted, and accounted for during subsequent processing. Parallel processing may be further enhanced by guarantying a compactness condition with respect to the attribute or property defining a collection. That is to say, the attributes or properties are defined in such a way that a data item belongs to only one collection. In accordance with the principles described herein, a collection record is associated with each collection of data within the data stream, and appears in the data stream 200 in the same order as the collection is encountered in the data stream. Specifically, the confirmation that a collection record is persisted allows the next one to be persisted. Therefore these collection records will be in order in the data stream.

For instance, referring back to FIG. 2, bracket 201 shows a range of data items spanning from the first data item of a first collection to the last data item of the first collection. Accordingly, all data items within the first collection are within the bracket 201, though the bracket 201 may also include some data items from other collections of data items. There is an associated collection record 211 for the collection encompassed by bracket 201, and that is inserted in the data stream 200 after the last item in the first collection (i.e., to the right of the bracket 201).

Likewise, bracket 202 shows a range of data items spanning from the first data item of a second collection to the last data item of the second collection. Accordingly, all data items within the second collection are within the bracket 202, though the bracket 202 may also include some data items from other collections of data items. For instance, since brackets 201 and 202 overlap, there are data items from both the first collection and the second collection in the data stream 200 where the brackets 201 and 202 overlap. There is also an associated collection record 212 (to the right of bracket 202) for the second collection encompassed by bracket 202.

Finally, bracket 203 shows a range of data items spanning from the first data item of a third collection to the last data item of the third collection. Accordingly, all data items within the third collection are within the bracket 203, though the bracket 203 may also include some data items from other collections of data items. For instance, since brackets 202 and 203 overlap, there are data items from both the second collection and the third collection in the data stream 200 where the brackets 202 and 203 overlap. There is also an associated collection record (not shown) for the third collection encompassed by bracket 203 that would appear after the last data item in the third collection within the data stream 200 (i.e., to the right of bracket 203 in the data stream 200).

In this description and in the claims, a particular collection of data items would "overlap" a comparison collection of data items if 1) any data item within the particular collection of data items is interspersed between the first and last data items of the comparison collection within the data stream, or 2) any data item within the comparison collection of data items is interspersed between the first and last data items of the particular collection within the data stream.

In one example, the data stream 200 is a log, and the ellipses 210 represent log entries representing tasks performed in a data system (such as a database system). In particular, perhaps the collection of data items is defined by a transaction identifier, or a transaction identifier range. Thus, all log entries having a first transaction identifier range are in a first collection (also called a transaction segment), and all log entries having a second transaction identifier range are in a second transaction segment. Selecting collections by non-overlapping transaction identifier ranges allows the collections (i.e., the transaction segments) to be processed more suitably in parallel since each log entry will belong to, at most, one transaction segment.

In data systems that perform multiple transactions simultaneously, the last task of the latest completed transaction in a prior non-overlapping transaction identifier range may indeed be completed after the first task of the first transaction of the subsequent non-overlapping transaction identifier range is initiated. Since transactions are performed by the computing system 100 in parallel with multiple transactions being active at a time, the order of completion of the transactions is not guaranteed, and often is not, the same as the order that the transactions were initiated. After all, some transactions may be more long running than others just due to the wide variety of transactions that may be performed. Thus, transaction segments meet the compactness condition with respect to transaction identifiers, but do not guaranty or even aim to meet the compactness condition with respect to log entries. That is to say, a log entry that falls between the first and last log entries of a particular transaction segment may not actually belong to the transaction segment.

When applying the broader principles in cases in which the data stream is a log of a transactional data system, and in which the collections are transaction segments defined by a transaction identifier range (hereinafter called the "transactional log example"), the collection record may be called a "transaction segment record". Since a collection record is created for each collection, when applying the principles to the transactional log example, a transaction segment record is created for transactions within a particular transaction identifier range. Although the principles described herein may apply to any data stream having overlapping collections of data items, the description will now focus more on the specific transactional log example.

In this description and in the claims, a particular transaction identifier range would "overlap" a comparison transaction identifier range if 1) any transaction identifiers within the particular transaction identifier range was indicative of being a transaction completed (i.e., committed or aborted) between an earliest and latest completed transactions of the comparison transaction identifier range or 2) any transaction identifiers within the comparison transaction identifier range was indicative of being a transaction completed between an earliest and latest completed transactions of the particular transaction identifier range.

For instance, suppose that the computing system assigns monotonically increasing transaction identifiers as new transactions are completed. Now suppose the particular transaction identifier range included transaction identifiers 4, 6 and 8. Suppose further that the comparison transaction identifier range included transaction identifiers 7, 9 and 10. In that case, the particular transaction identifier range overlaps with the comparison transaction identifier range because the particular transaction identifier range includes a transaction identifier 8 which is indicative of the associated transaction being completed between an earliest completed transaction (having transaction identifier 7) and a latest completed transaction (having transaction identifier 10) of the comparison transaction identifier range. As a separate reason for overlap, the comparison transaction identifier range includes a transaction identifier 7 which is indicative of the associated transaction being completed between an earliest completed transaction (having transaction identifier 4) and a latest completed transaction (having transaction identifier 8) of the particular transaction identifier range.

Now suppose that the comparison transaction identifier range included transaction identifiers 9, 10, 11. Now there is no overlap because both conditions of non-overlap are satisfied. Specifically, the first condition is that the particular transaction identifier range includes no transaction identifiers (the highest being transaction identifier 8) which is indicative of the associated transaction being completed between an earliest completed transaction (having transaction identifier 9) and a latest completed transaction (having transaction identifier 11) of the comparison transaction identifier range. The second condition is that the comparison transaction identifier range includes no transaction identifiers (the lowest being transaction identifier 9) which is indicative of the associated transaction being completed between an earliest completed transaction (having transaction identifier 4) and a latest completed transaction (having transaction identifier 8) of the particular transaction identifier range.

The non-overlapping conditions also apply when the comparison transaction identifier range includes transactions completed earlier than the transactions of the particular transaction identifier range. For instance, suppose that the comparison transaction identifier range includes transaction identifiers 1, 2 and 5. In that case, the particular transaction identifier range overlaps with the comparison transaction identifier range because the particular transaction identifier range includes a transaction identifier 4 which is indicative of the associated transaction being completed between an earliest completed transaction (having transaction identifier 1) and a latest completed transaction (having transaction identifier 5) of the comparison transaction identifier range. As a separate reason for overlap, the comparison transaction identifier range includes a transaction identifier 5 which is indicative of the associated transaction being completed between an earliest completed transaction (having transaction identifier 4) and a latest completed transaction (having transaction identifier 8) of the particular transaction identifier range.

Now suppose that the comparison transaction identifier range included transaction identifiers 1, 2 and 3. Now there is no overlap because both conditions of non-overlap are satisfied. Specifically, the first condition is that the particular transaction identifier range includes no transaction identifiers (the lowest being transaction identifier 4) which is indicative of the associated transaction being completed between an earliest completed transaction (having transaction identifier 1) and a latest completed transaction (having transaction identifier 3) of the comparison transaction identifier range. The second condition is that the comparison transaction identifier range includes no transaction identifiers (the highest being transaction identifier 3) which is indicative of the associated transaction being completed between an earliest completed transaction (having transaction identifier 4) and a latest completed transaction (having transaction identifier 8) of the comparison transaction identifier range.

As an example, suppose there were three transaction segment identifier ranges: a first associated with transaction identifiers 0 through 2; a second associated with transaction identifiers 3 through 5; and a third associated with transaction identifiers 6 through 8. In this case, the first, second, and third transaction identifier ranges do not overlap. The non-overlapping condition with respect to transaction identifiers is referred to as the "compactness" condition with respect to transaction identifiers. However, the meeting of the compactness condition with respect to transaction identifiers does not mean that the compactness condition is met with respect to the log entries themselves.

Figure 3:
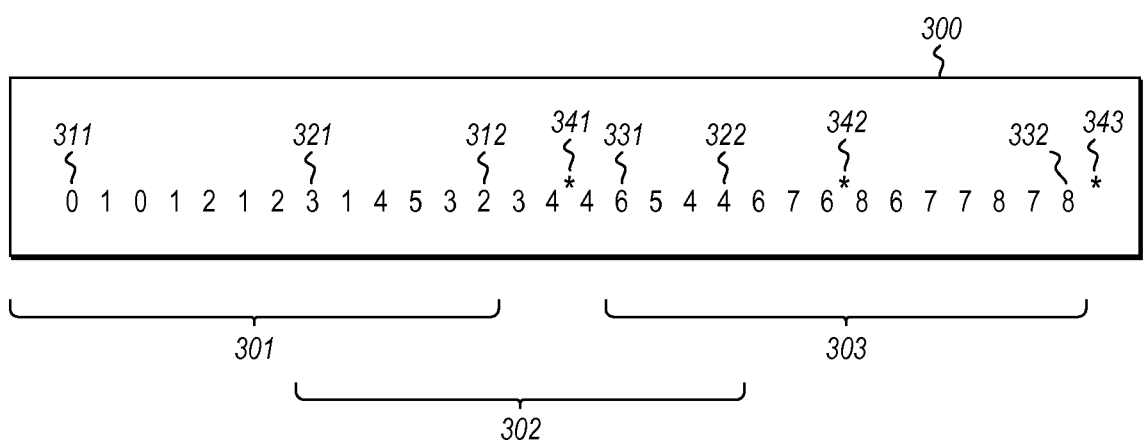
FIG. 3 illustrates a log that represents an example of the data stream of FIG. 2.

FIG. 3 illustrates a more specific example log 300 that represents an example of the log 200 of FIG. 2, in which the first brackets 301 is associated with transaction identifiers 0 through 2; the second brackets 302 is associated with transaction identifiers 3 through 5, and the third brackets 303 is associated with transaction identifiers 6 through 8. Each number within the log 300 represents a task entry having the number as the associated transaction identifier.

Figure 4:
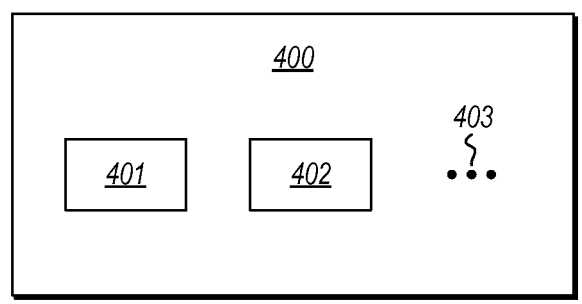
FIG. 4 illustrates a collection record in accordance with the principles described herein.

FIG. 4 illustrates a collection record 400 in accordance with the principles described herein. The collection record 400 includes a collection definition field 401 that defines the properties that a data item is to meet in order to be considered part of the collection. For instance, if the collection record 400 were applied in the transactional log example, the collection record 400 would be a transaction segment record. The field 401 would further include the transaction identifier range associated with the transaction segment.

There would be a collection record 400 created for each collection of data items within the data stream. As applied to the transactional log example, there would be a transaction segment record created for each non-overlapping transaction identifier range. For instance, there may be a transaction segment record for each of the non-overlapping transaction identifier ranges 301, 302 and 303 of FIG. 3. Other examples of collection definitions might include which device created the data item, a region from which the data item originated, a semantic and/or syntactic rule set followed by the data item, a timeframe in which a data set was created or registered, and so forth.

The collection record 400 also includes a data stream address range field 402 that defines the extent of the collection within the data stream. For instance, the data stream address range field defines a location at or prior to the first appearance of a data item of the associated collection within the data stream, and defines a location at or after the last appearance of a data item of the associated collection within the data stream. For instance, as applied to the transactional log example, the data stream address range field 402 may define a log entry identifier range 402. An example of a log entry identifier is a log sequence number (LSN). Accordingly, an example of a log entry identifier range is a log sequence number range. The collection record 400 also includes potentially other fields 403, and thus is not limited to the collection definition field 401 and the data stream address range field 402.

For the transaction identifier range 0 to 2 associated with the bracket 301, the collection record 400 would identify the transaction identifier range 0 to 2 within field 401. The collection record 400 would also include within field 402 a log entry identifier range beginning at the first task entry 311 associated with the first initiated transaction of the transaction identifier range and ending at the last task entry 312 associated with the last completed transaction of the transaction identifier range. The collection record 400 may then be placed as a transaction segment record in the log after the last task entry 312. For instance, asterisk 341 may represent the transaction segment record for transaction identifier range 0 to 2 spanning bracket 301.

For the transaction identifier range 3 to 5 associated with the bracket 302 the collection record 400 would identify the transaction identifier range 3 to 5 within field 401. The collection record 400 would also include within field 402 a log entry identifier range beginning at the first task entry 321 associated with the first initiated transaction of the transaction identifier range and ending at the last task entry 322 associated with the last completed transaction of the transaction identifier range. The collection record 400 may then be placed as a transaction segment record in the log after the last task entry 322. For instance, asterisk 342 may represent the transaction segment record for transaction identifier range 3 to 5 spanning bracket 302.

For the transaction identifier range 6 to 8 associated with the bracket 303 the collection record 400 would identify the transaction identifier range 6 to 8 within field 401. The collection record 400 would also identify within field 402 a log entry identifier range beginning at the first task entry 331 associated with the first initiated transaction of the transaction identifier range and ending at the last task entry 332 associated with the last completed transaction of the transaction identifier range. The collection record 400 may then be placed as a transaction segment record in the log after the last task entry 332. For instance, asterisk 343 may represent the transaction segment record for transaction identifier range 6 to 8 spanning bracket 303.

In some embodiments, the confirmation that a transaction segment definition record is persisted allows the next one to be persisted. Therefore these transaction segment records will be in transaction identifier order in the log. Accordingly, in FIG. 3, the transaction segment record 341 associated with transaction identifier range 0 to 2 is placed in the log 300 prior to the transaction segment record 342 associated with the transaction identifier range 3 to 5. Likewise, the transaction segment record 342 associated with transaction identifier range 3 to 5 is placed in the log 300 prior to the transaction segment record 343 associated with the transaction identifier range 6 to 8. In the broader context, the order of the collection records with the data stream may be the same as the order in which each associated collection is encountered in the data stream.

Figure 5:
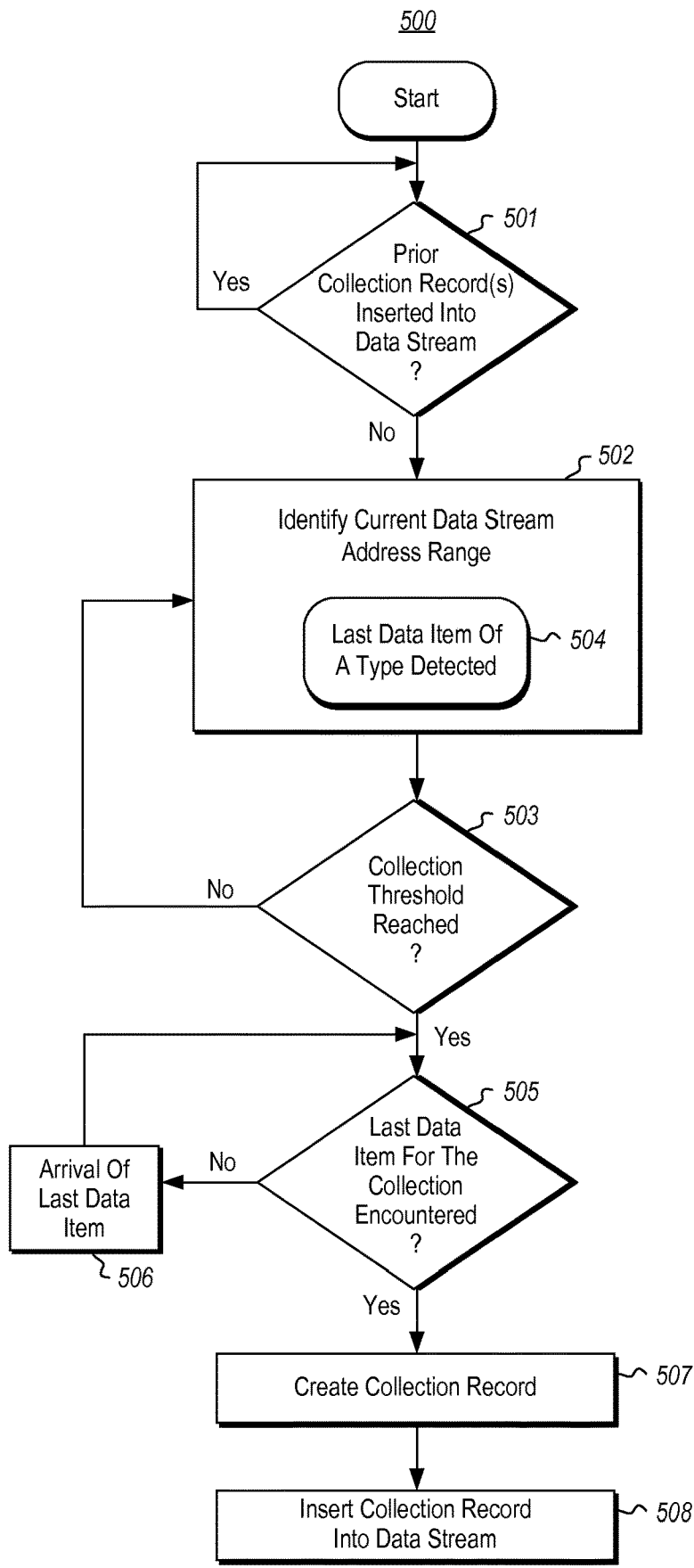
FIG. 5 illustrates a flowchart of a method for creating a collection record, which may be used to create each collection record in the sequence of collection records.

FIG. 5 illustrates a flowchart of a method 500 for creating a collection record, which may be used to create each collection record in the sequence of collection records. For instance, with reference to FIG. 3, the method 500 may be applied three times to generate transaction segment records 341, 342 and 343.

It is determined whether any prior collection records, if any, in the sequence of collection records have been inserted into the data stream (decision block 501). In the transactional log example, the more specific determination would be whether any prior transaction segment record, if any, in the sequence of transaction segment records are yet to be inserted into the data stream.

For instance, transaction segment record 341 is the first transaction segment record 341 in the sequence of three transaction segment records of FIG. 3. Accordingly, there are no prior transaction segment records that are to be written to the log ("Yes" in decision block 501). If the method 500 were being performed with respect to the transaction segment record 342, then transaction segment record 341 would first be written to the log in order to follow the "Yes" branch in the decision block 501 of FIG. 5. If the method 500 were being performed with respect to the transaction segment record 343, then transaction segment record 342 would first be written to the log in order to follow the "Yes" branch in the decision block 501 of FIG. 5. If there did exist prior transaction segment records that are yet to be written to the log ("No" in decision block 501), then the method 500 would simply await the writing of all prior transaction segment records in the sequence to be written to the log.

Upon determining that all prior collection records have been inserted into the data stream ("Yes" in decision block 501), a current collection definition of the current collection is identified (act 502). In the context of the transactional log example, the latest present transaction identifier of the transaction segment record is identified. The beginning of the transaction identifier range to the latest present transaction identifier defines a current transaction identifier range for the transaction segment record.

It is then determined whether a threshold has been reached with respect to the collection (decision block 503) based on the current collection definition. An example of such a threshold might be a time-based threshold. For instance, the collection might remain open for a certain amount of time. Alternatively, the collection might close upon encountering a time threshold since the last new transaction or particular event type was encountered in the data stream. The principles described herein contemplate any threshold. In the description which follows, an example threshold will be described in term of a size threshold. For instance, in the context of the transactional log example, this size may be defined as the cumulative sum of all of the sizes of the transactions as expressed in binary representation. If the collection has not reached a particular threshold ("No" in decision block 503), then the method 500 returns to act 502.

The current collection definition associated with a collection may broaden as further data items are evaluated in the data stream. This will result from detection (event 504) of a last data item of a particular type that falls outside of the current collection definition, but which could fall inside the collection definition if modified, without losing the compactness condition for that collection definition. For instance, in the transactional log example, the present latest transaction identifier may change resulting in a new identification of the present latest transaction identifier if transactions later than a present latest transaction identifier are detected as completed. This would result in expansion in the current transaction identifier range for the transaction segment record. In the case in which monotonically increasing transaction identifiers are assigned at transaction completion time, this simplifies the process of expanding the transaction identifier range.

Event 504 remains active as a possibility until collection has reached the particular threshold ("Yes" in decision block 503). The event 504 being active means that the current collection definition may still expand. However, once the collection has reached a particular threshold ("Yes" in decision block 503), the collection transitions from an open state to a closing state. Hereafter, a collection is in an "open state" if the current collection definition may change, and a "closing state" if the collection definition may not change. In some embodiment, the decision block 503 is optional, and thus the collection transitions from the open state (in which the current collection definition may expand) to a closing state (in which the collection definition is fixed) immediately, or in response to some other condition.

For instance, as applied to the transactional log example, in the case of the particular threshold being a size, if the size of the transaction segment reaches a certain size, then the transaction identifier range of that transaction segment may no longer expand. Thus, the transaction segment transitions from an open state to a closing state, such that a change in the transaction identifier range is no longer accepted in response to detecting completion of subsequent transactions.

Once the state transition occurs, it is then determined whether the last data item for the collection has been encountered in the data stream (decision block 505). For instance, in the context of the transactional log example, it is then determined whether there are any transactions have a transaction identifier within the present transaction identifier range that have not yet completed, either by being committed or aborted.

If the last data item of the collection has not yet been encountered in the data stream ("No" in decision block 505), then the method awaits encountering of the last data item of the collection (act 506). In the context of the transactional log example, if all of the transactions having a transaction identifier within the transaction identifier range have not been completed, then the method awaits completion of all of such transactions.

Otherwise, if the last data item of the collection has been encountered in the data stream ("Yes" in decision block 505), the collection record is created (act 507), and placed into the data stream (act 508). In the context of the transactional log example, if all of the transactions having a transaction identifier within the transaction identifier range have been completed, then the transaction segment record is created, and placed into the log. The placing of the collection record in the data stream may result in a future iteration of the method 500 with respect to the subsequent collections branching along the "Yes" branch of FIG. 5.

Figure 6:
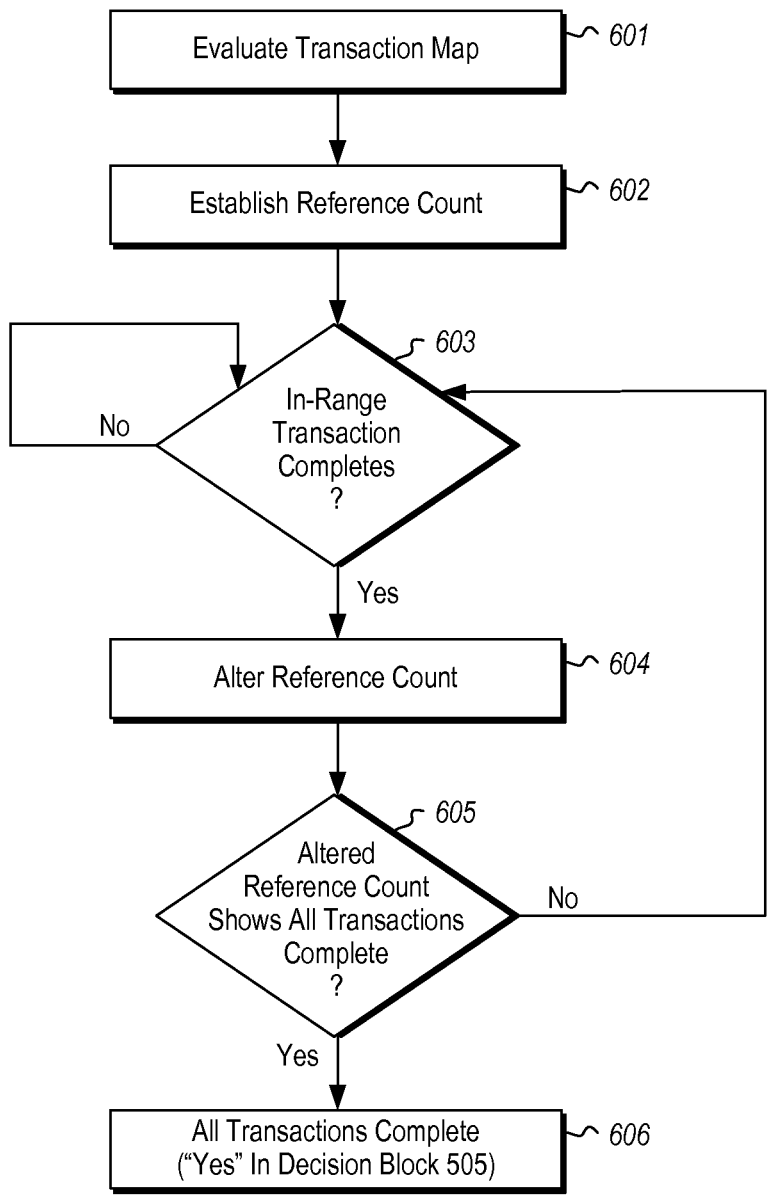
FIG. 6 illustrates a flowchart of a method for determining if there are any transactions having a transaction identifier within the present transaction identifier range that have not yet completed.

FIG. 6 illustrates a flowchart of a method 600 for determining if there are any transactions having a transaction identifier within the present transaction identifier range that have not yet completed. The method 600 represents one example of how decision block 505 might be performed in the transactional log example. First, a transaction map is evaluated that shows active transactions according to transaction identifier (act 601). Then a reference count is established based on how many active transactions there are within the transaction identifier range (act 602) that have not yet completed. If a transaction having a transaction identifier within the transaction identifier range is not detected as completed ("No" in decision block 603), then the method 600 remains at decision block 603.

Thereafter, however, each time a transaction having a transaction identifier within the transaction identifier range is detected as completed ("Yes" in decision block 603), the reference count is altered (act 604) so as to represent a decrementing of the identified number of transactions within the transaction identifier range that having not yet completed. If the reference count still represents that one or more transactions are yet to be completed ("No" in decision block 605), then the method 600 returns to decision block 603 to await another indication that a transaction within range of the transaction identifier range has completed. Otherwise ("Yes" in decision bloc 605), if the reference count indicates that all transactions have completed, then the method 600 ends (act 606) resulting in a branching along the "Yes" branch of decision block 505 of FIG. 5. Again, this would result in creation of the transaction segment record (act 507) and the writing of the transaction segment record to the log (act 508).

Previously, this description has mentioned that when a collection is in an open state, the collection may receive notifications that the last entry of events having a parameter has been encountered, resulting in potentially broadening of the current collection definition to encompass the scope of that parameter. However, when the collection transitions to a closing state, the collection no longer expands the collection definition associated with the collection. In one embodiment, the open collection may be represented by a data structure that is relatively small—such as perhaps 256 or even 128 bits or less. This allows changes to be made to the open collection data structure in one processing cycle, thereby ensuring that changes to the open collection data structure are made atomically. Thus, the open collection data structure may be lockless, such that no locks need be taken on that data structure. Such allows for efficient management of the open collection data structure such that millions of collections may be processed per second.

Figure 7:
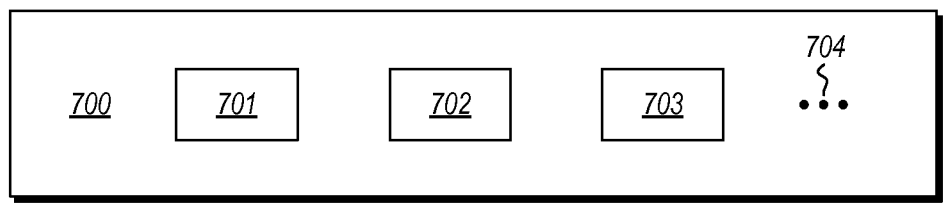
FIG. 7 illustrates an example of the open collection data structure.

FIG. 7 illustrates an example of an open collection data structure 700. Within the open collection data structure 700 may be a number of fields 701 through 703. For instance, the fields 701 and 702 might define the current collection definition for the collection. In the transactional log example, field 701 might represent the beginning transaction identifier, and field 702 might represent a current latest transaction identifier. The open collection data structure 700 could also include a "can close" bit 703, representing that the collection segment has reached the predetermined threshold (and thus branched along "Yes" in decision block 503). The open collection data structure 700 may also include other fields as represented by ellipses 704). The method 500 causes there to be only one open collection at a time. This is because the method 500 is not re-performed until the prior iteration of the method 500 has completed act 508, resulting in the collection record being inserted into the data stream, and thereby initiating the method 500 for the next collection along the "Yes" branch in decision block 501. Accordingly, there need only be a single open collection data structure 700 at a time. This simplicity allows for high volume in handling collections since each collection passes through the open collection segment data structure 700 as a gateway, allowing the collections to be processed by a single thread and managing all information in a small data structure in a lockless manner. The open collection data structure 700 may be changed millions of times a second. Accordingly, in the transactional log example, the open collection data structure 700 may be used to handle millions of transactions per second.

Figure 8:
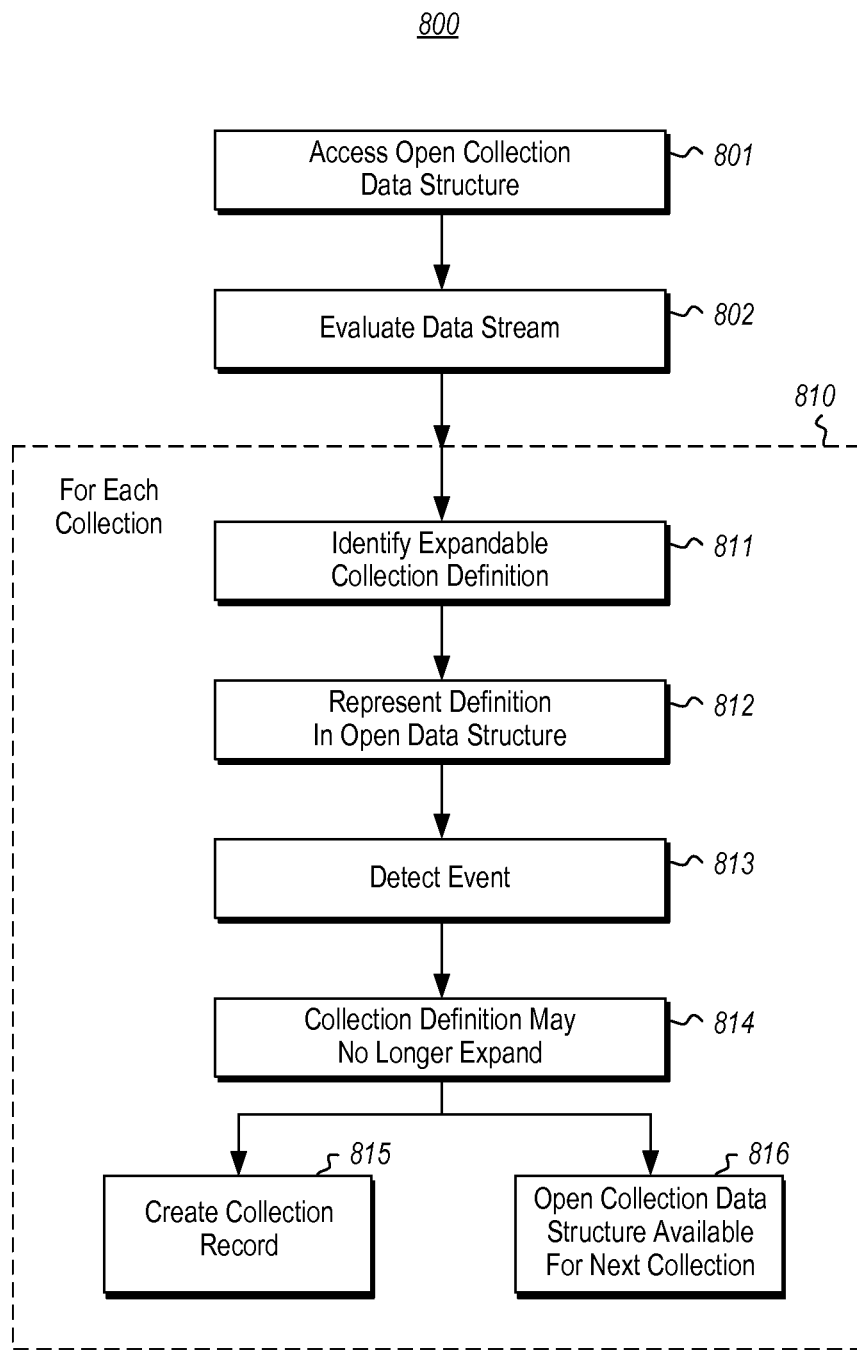
FIG. 8 illustrates a flowchart for a method for using an open collection data structure to create a sequence of collection records.

FIG. 8 illustrates a flowchart for a method 800 for using an open collection data structure to create a sequence of collection records. The method 800 includes accessing the open collection data structure (act 801) and evaluating a data stream that includes multiple different types of data items (act 802). For instance, the computing system 100 of FIG. 1 may access the open collection data structure 700 of FIG. 7 (act 801), and also begin evaluation of the data stream 200 (act 802). In accordance with act 810, the open collection data structure is then used to create the sequence of collection records.

Specifically, as part of the act 810, the system identifies an expandable collection definition associated with an open collection for which a collection record is to be created (act 811). This was described above with respect to act 502 and event 504 of FIG. 5. So long as the event 504 is active due to the collection being in an open state, the collection definition remains expandable. The collection definition while expandable may at least in some instances be expanded to include data items of a particular data item type if the last data item of that particular data item type is encountered in the data stream. For instance, as described above, upon detection of event 504, the collection definition may expand.

The method 800 then includes representing the expandable collection definition within the open collection data structure (act 812). For instance, the open collection data structure 700 has been described as representing the collection definition within field 701. The field 701 may include an internally descriptive definition, or may simply point to another location that defines a full collection definition.

Furthermore, upon detecting an event (act 813), it is determined that the collection definition is no longer expandable. This has been described above with respect to the event 504 causing the collection definition to expand, but once the collection is determined to have encountered the particular threshold (e.g., has reached a certain size) ("Yes" in decision block 503), it is determined that the collection definition may no longer expand (act 814). In response, the collection record is created (act 507 and also act 815), and the open collection data structure is also made available for use by the next collection (act 816). Note that act 816 is shown in parallel with act 815 to represent that there is no time dependency between the two acts. That said, unless the collection record for the current collection is generated, the next collection is not closed. However, at the same time, when the current collection is marked as full (act 814) (meaning it can no longer expand), events are classified to the next collection—meaning that the next collection is open for allocation often even before the collection record is written to the data stream itself.

Figure 9:
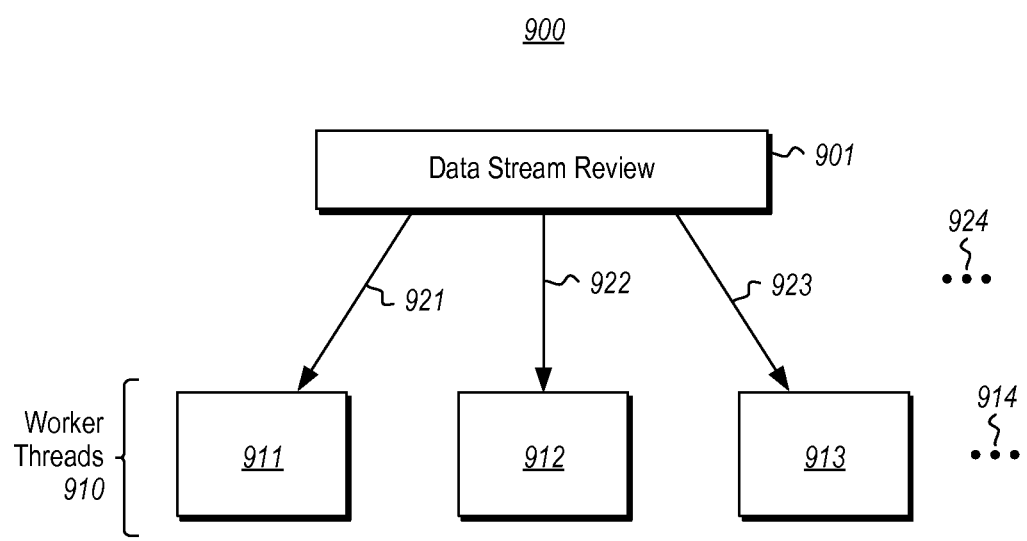
FIG. 9 illustrates an architecture associated with the use of a data stream that includes therein data items a sequence of collection records associated with collections of the data items.

FIG. 9 illustrates an architecture 900 associated with the use of a data stream that includes therein a sequence of collection records. For instance, the architecture 900 may be used to process the data stream 200 of FIG. 2, or the log 300 of FIG. 3. The architecture 900 includes a data stream review module 901, and multiple worker threads 910. For instance, in FIG. 9, the worker threads are illustrated as three worker threads 911, 912 and 913, but the ellipses 914 represents that there may be any number of worker threads 910 in operation, and the number of worker threads in operation 910 may vary over time.

Figure 10:
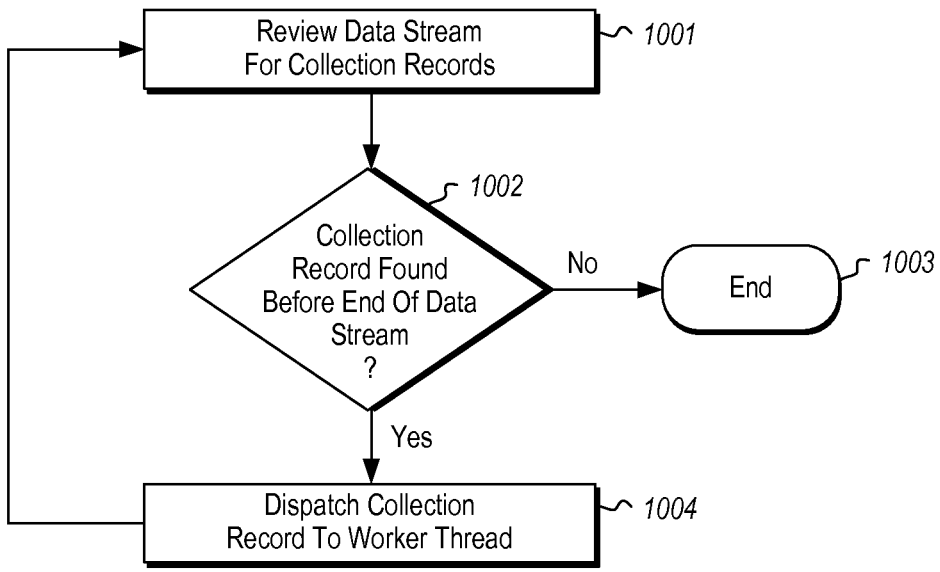
FIG. 10 illustrates a flowchart of a method for using the data stream from the perspective of the data stream review module of FIG. 9.

FIG. 10 illustrates a flowchart of a method 1000 for using the data stream from the perspective of the data stream review module 901 of FIG. 9. The data stream review module 901 reviews the data stream to find the sequence of collection records (act 1001). Such a review may be performed quickly since most data items in the data stream may simply be skipped over upon confirming that the data item is not a collection record. Then, when the data stream review module finds a collection record ("Yes" in decision block 1002), the corresponding collection record is dispatched to a corresponding worker thread (act 1004). This may involve starting a worker thread if there is not previously a worker thread available. The data stream review module 901 thereafter continues to review the data stream (act 1001). Once the end of the data stream is encountered ("No" in decision block 1003), the method ends (act 1004).

For instance, applying the method 1000 of FIG. 10 an the architecture 900 of FIG. 9 to the example log 300 of FIG. 3, the data stream review module 901 would scan the log 300 (act 1001) until the transaction segment record 341 is found ("Yes" in decision block 1002). The data stream review module 901 would then dispatch (as represented by arrow 921) the transaction segment record 341 to a worker thread 911 (act 1004), and continue scanning the log (act 1001) for more transaction segment records.

The data stream review module 901 would next encounter transaction segment record 342 ("Yes" in decision block 1002). The data stream review module 901 would then dispatch (as represented by arrow 922) the transaction segment record 342 to a worker thread 912 (act 1004), and continue scanning the log (act 1001) for more transaction segment records.

The data stream review module 901 would next encounter transaction segment record 343 ("Yes" in decision block 1002). The data stream review module 901 would then dispatch (as represented by arrow 923) the transaction segment record 343 to a worker thread 913 (act 1004), and continue scanning the log (act 901) for more transaction segment records. However, no further transaction segment records are found in the log 300 ("No" in decision block 1003), and thus the method 300 would end (act 1003). If there were more transaction segment records and more worker segments (as represented by ellipses 913), then the method 1000 may be iterated further in order to dispatch (as represented by ellipses 924) the transaction segments to those other worker segments as well.

Figure 11:
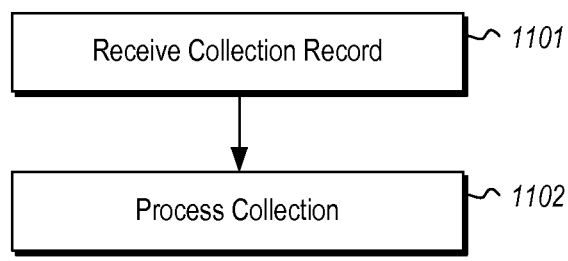
FIG. 11 illustrates a flowchart of a method for using the data stream from the perspective of any of the worker threads of FIG. 9.

FIG. 11 illustrates a flowchart of a method 1100 for using the data stream from the perspective of any of the worker threads 910 of FIG. 9. The corresponding worker thread receives the collection record (act 1101), and responsive thereto, processes the collection (act 1102). For instance, in FIG. 9, the worker thread 911 receives (act 1101 and represented by arrow 921) the transaction segment record 341, and processes (act 1102) the transaction segment defined by that transaction segment record 341. The worker thread 912 receives (act 1101 and represented by arrow 922) the transaction segment record 342, and processes (act 1102) the transaction segment defined by that transaction segment record 342. Likewise, the worker thread 913 receives (act 1101 and represented by arrow 923) the transaction segment record 343, and processes (act 1102) the transaction segment defined by that transaction segment record 343.

Examples of processing (act 1102) the collection includes serialization of the associated collection such as for purposes of checkpointing the data stream, storing the data stream, transmitting the data stream, or the like. One particular example of processing (act 1102) that is particularly suitable in the transaction log example is performing a redo of the transactions, such as perhaps during a recovery operation.

The log scanning and dispatching of collection records of FIG. 10 may occur relatively quickly. In contrast, the processing of the collections of FIG. 11 may take a little more time. Thus, the processing of the data stream may be viewed as a quick dispatch (of FIG. 10) and parallel processing (of FIG. 11) operation. This allows the worker threads to process each collection substantially in parallel, thereby allowing the data stream as a whole to be processed more quickly and efficiently. Such parallel operations are facilitated by the fact that the collection definitions have compactness with respect to its parameters. For instance, in the transactional log example, the transaction segment records themselves have compactness with respect to transaction identifiers. Thus, each worker thread may process the collection without conflicting processing from other worker threads trying to also process data items from that same collection.

Accordingly, the principles described herein provide an effective mechanism to create a collection record that define compact collections. This compactness allows for quick dispatch and parallel processing of the data stream, thereby significantly improving the efficiency of data stream processing operations—such as serialization and redo.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   a computer-readable storage media having stored thereon computer-executable instructions that are executable by the one or more processors to cause the computing system to insert collection records associated with a plurality of collections of transaction segment records into a data stream that contains a plurality of transaction segment records, each of the plurality of transaction segment records corresponding to a transaction identifier and a data stream address, each transaction identifier being assigned sequentially when the corresponding transaction is started, each of the plurality of transaction segment records being entered into the data stream after the transaction segment is completed, at least two different transactions being performed in parallel, and a plurality of data stream addresses corresponding to the at least two different transactions that are performed in parallel overlapping, the computer-executable instructions including instructions that are executable to cause the computing system to perform at least the following:
   for a non-overlapping range of transaction identifiers,
      identify a collection of transaction segment records within the data stream, the collection of transaction segment records comprising a plurality of transaction segment records, each of which corresponds to a transaction identifier that is within the corresponding non-overlapping range of transaction identifiers;
      establish a reference count that represents the identified collection of transactions within the range of transaction identifiers that have not yet completed;
      each time a transaction that has a transaction identifier within the range of transaction identifiers is detected as completed, alter the reference count so as to represent a decrementing of the identified collection of transactions within the range that have not yet completed;
      when the reference count represents that there are no further transactions having transaction identifiers within the range that have not completed, create a corresponding collection record comprising,
         the corresponding range of the transaction identifiers that is not overlapping with a range of sequential identifiers of another collection of transaction segment records, and
         a data stream address range at least extending from a first transaction segment record of the collection to a last transaction segment record of the collection; and
      insert the created collection record into the data stream at any place after the last transaction segment record of the corresponding collection of transaction segment records, wherein a data stream address range of at least one collection of transaction segment record overlaps a data stream address range of at least another collection of transaction segment, the overlapping address range being caused by the at least two different transactions being performed in parallel.

2. The computing system in accordance with claim 1, the data stream being a log.

3. The computing system in accordance with claim 2, the collection records being transaction segment records, the collection comprising a transaction identifier range.

4. The computing system in accordance with claim 3, wherein for each collection of transaction segment records, the transaction segment records are created by performing the following:
   determining that any prior transaction segment records, if any, in the collection of transaction segment records have been written to the log;
   in response to determining that any prior transaction segment records have been written to the log, identifying a latest transaction identifier of the transaction segment record, thereby identifying the transaction identifier range of the transaction segment record;
   determining if there are any transactions having a transaction identifier within the transaction identifier range that have not yet completed;
   if there are any transactions having a transaction identifier that is within the transaction identifier range that has not yet completed, awaiting completion of the uncompleted transactions that are within the transaction identifier range;
   upon determining that all of the transactions within the transaction identifier range have completed, creating the transaction segment record; and
   placing the transaction segment record into the log.

5. The computing system in accordance with claim 4, wherein for each of at least one collection of transaction segment records, determining if there are any transactions having a transaction identifier within the transaction identifier range that have not yet completed comprises:
   evaluating a transaction map that shows active transactions according to transaction identifier.

6. The computing system in accordance with claim 4, wherein for each of at least one collection of transaction segment records, determining if there are any transactions having a transaction identifier within the transaction identifier range that have not yet completed comprises:

identifying a number of transactions within the transaction identifier range that have not yet completed.

7. The computing system in accordance with claim 1, a range of data stream address of a given collection record overlapping a range of data stream address of at least one of a neighboring prior collection of transaction segment records and a neighboring subsequent collection of transaction segment records in the plurality of collections of transaction segment records.

8. The computing system in accordance with claim 1, a range of data stream address of a given collection record overlapping a range of data stream address of both of a neighboring prior collection of transaction segment records and a neighboring subsequent collection of transaction segment records in the plurality of collections of transaction segment records.

9. A method, implemented at a computing system that includes one or more processors, for inserting collection records associated with a plurality of collections of transaction segment records into a data stream that contains a plurality of transaction segment records, each of the plurality of transaction segment records corresponding to a transaction identifier and a data stream address, each transaction identifier being assigned sequentially when the corresponding transaction is started, each of the plurality of transaction segment records being entered into the data stream after the transaction segment is completed, at least two different transactions being performed in parallel, and a plurality of data stream addresses corresponding to the at least two different transactions that are performed in parallel overlapping, the method comprising:
  for a non-overlapping range of transaction identifiers,
    identifying collection of transaction segment records within the data stream, the collection of transaction segment records comprising a plurality of transaction segment records, each of which corresponds to a transaction identifier that is within the corresponding non-overlapping range of transaction identifiers;
    establishing a reference count that represents the identified collection of transactions within the range of transaction identifiers that have not yet completed;
    each time a transaction that has a transaction identifier within the range of transaction identifiers is detected as completed, altering the reference count so as to represent a decrementing of the identified collection of transactions within the range that have not yet completed;
    when the reference count represents that there are no further transactions having transaction identifiers within the range that have not completed, creating a corresponding collection record comprising,
      the corresponding range of the transaction identifiers that is not overlapping with a range of sequential identifiers of another collection of transaction segment records, and
      a data stream address range at least extending from a first transaction segment record of the collection to a last transaction segment record of the collection; and
    inserting the created collection record into the data stream at any place after the last transaction segment record of the corresponding collection of transaction segment records,
    wherein a data stream address range of at least one collection of transaction segment record overlaps a data stream address range of at least another collection of transaction segment, the overlapping address range being caused by the at least two different transactions being performed in parallel.

10. The method in accordance with claim 9, wherein for each of a sequence of collection records, the collection records are created by performing the following:
  determining that any prior collection records, if any, in the sequence of collection records have been inserted into the data stream;
  in response to determining that any prior collection records have been inserted into the data stream, identifying a current collection definition of the collection;
  determining if there are any transaction segment record in that data stream that satisfy the current collection definition that have not yet been encounter in the data stream;
  if there are any transaction segment record in the data stream that satisfy the current collection definition that have not yet been encountered in the data stream, awaiting encountering of the last transaction segment record that satisfies the current collection definition in the data stream;
  upon determining that all of the transaction segment records within the current collection definition have been encountered in the data stream, creating the collection record; and
  inserting the collection record into the data stream.

11. The method in accordance with claim 10, the collection record of each of the sequence of collections records having a data stream address that is later than a latest data stream address in the data stream address range of the collection corresponding to the collection record.

12. The method in accordance with claim 10, wherein at least until determining that any prior collection records, if any, in the sequence of collection records have been inserted into the data stream, the current collection definition may change to encompass a particular data item type if a last transaction segment record of a particular data item type is encountered in the data stream.

13. The method in accordance with claim 12, wherein until a particular condition is encountered after determining that any prior collection records, if any, in the sequence of collection records have been inserted into the data stream, the current collection definition may change to encompass a particular data item type if a last transaction segment record of a particular data item type is encountered in the data stream.

14. The method in accordance with claim 13, the particular condition being that the collection associated with the collection record has reached a predetermined size.

15. The method in accordance with claim 12, wherein a collection of transition segment records changes from an open state in which the current collection of transaction segment records may expand, to a closing state in which the current collection of transaction segment records may not expand, the collection when in the open state being represented by an open collection data structure that is lockless.

16. The method in accordance with claim 15, the open collection data structure being lockless because it can be entirely refreshed in a single processor cycle.

17. The method in accordance with claim 16, a size of the open collection data structure being 256 bits or less.

18. The method in accordance with claim 16, a size of the open collection data structure being 128 bits or less.

19. The method in accordance with claim 10, wherein for each of at least one of the sequence of collection records, the collection records are created by performing the following:
  determining that a collection size has reached a target size, wherein at least until determining that the collection size has reached a target size, the current collection of transaction segment record may change to encompass a particular data item type if a last data item of a particular data item type is encountered.

20. A computer program product comprising one or more computer-readable storage media having stored thereon computer-executable instructions that are executable by one or more processors of a computing system to cause the computing system to insert collection records associated with a plurality of collections of transaction segment records into a data stream that contains a plurality transaction segment records, each of the plurality of transaction segment records corresponding to a transaction identifier and a data stream address, each transaction identifier being assigned sequentially when the corresponding transaction is started, each of the plurality of transaction segment records being entered into the data stream after the transaction segment is completed, at least two different transactions being performed in parallel, and a plurality of data stream addresses corresponding to the at least two different transactions that are performed in parallel overlapping, the computer-executable instructions including instructions that are executable to cause the computing system to perform at least the following:

for a non-overlapping range of transaction identifiers,
identify a collection of transaction segment records within the data stream, the collection of transaction segment records comprising a plurality of transaction segments records, each of which corresponds to a transaction identifier that is within the corresponding non-overlapping range of transaction identifiers;
establish a reference count that represents the identified collection of transactions within the range of transaction identifiers that have not yet completed;
each time a transaction that has a transaction identifier within the range of transaction identifiers is detected as completed, alter the reference count so as to represent a decrementing of the identified collection of transactions within the range that have not yet completed;
when the reference count represents that there are no further transactions having transaction identifiers within the range that have not completed, create a corresponding collection record comprising,
the corresponding range of the transaction identifier that is not overlapping with a range of sequential identifiers of another collection of transaction segment records,
a data stream address range at least extending from a first transaction segment record of the collection to a last transaction segment record of the collection; and
insert the created collection record into the data stream at any place after the last transaction segment record of the corresponding collection of transaction segment records,
wherein a data stream address range of at least one collection of transaction segment record overlaps a data stream address range of at least another collection of transaction segment, the overlapping address range being caused by the at least two different transactions being performed in parallel.

21. The computer program product in accordance with claim 20, wherein for each of a sequence of collection records, the collection records are created by performing the following:

determining that any prior collection records, if any, in the sequence of collection records have been inserted into the data stream;
in response to determining that any prior collection records have been inserted into the data stream, identifying a current collection definition of the collection;
determining if there are any transaction segment records in that data stream that satisfy the current collection definition that have not yet been encounter in the data stream;
if there are any transaction segment records in the data stream that satisfy the current collection definition that have not yet been encountered in the data stream, awaiting encountering of the last transaction segment record that satisfies the current collection definition in the data stream;
upon determining that all of the transaction segment records within the current collection definition have been encountered in the data stream, creating the collection record; and
inserting the collection record into the data stream.

22. The computer program product in accordance with claim 21, the collection record of each of the sequence of collections records having a data stream address that is later than a latest data stream address in the data stream address range of the collection corresponding to the collection record.

23. The computer program product in accordance with claim 21, wherein at least until determining that any prior collection records, if any, in the sequence of collection records have been inserted into the data stream, the current collection definition may change to encompass a particular data item type if a last transaction segment record of a particular data item type is encountered in the data stream.

24. The computer program product in accordance with claim 23, wherein until a particular condition is encountered after determining that any prior collection records, if any, in the sequence of collection records have been inserted into the data stream, the current collection definition may change to encompass a particular data item type if a last transaction segment record of a particular data item type is encountered in the data stream.

* * * * *